United States Patent [19]

Spirk et al.

[11] Patent Number: 4,796,784
[45] Date of Patent: Jan. 10, 1989

[54] SOFT ICE CREAM DISPENSER

[75] Inventors: John W. Spirk; John R. Nottingham, both of Moreland Hills; Jeffrey M. Kalman, Cleveland Heights, all of Ohio

[73] Assignee: G & S Metal Product Company, Inc., Cleveland, Ohio

[21] Appl. No.: 69,099

[22] Filed: Jul. 2, 1987

[51] Int. Cl.4 .............................................. B67D 5/00
[52] U.S. Cl. ...................................... 222/80; 222/252; 222/390; 222/405; 425/297
[58] Field of Search ................. 222/180, 80, 386, 390, 222/401, 405, 252; 241/92, D17; 425/315, 316, 313, 376 R, 297

[56] References Cited

U.S. PATENT DOCUMENTS

| 1,338,743 | 5/1920 | Lyman | 222/390 X |
| 1,942,248 | 1/1934 | Kemp | 222/390 X |
| 2,751,118 | 6/1956 | Soule | 222/168 X |
| 3,156,387 | 11/1964 | Harwood | 222/390 |
| 3,159,317 | 12/1964 | Mini | 222/385 X |

Primary Examiner—Kevin P. Shaver
Attorney, Agent, or Firm—Pearne, Gordon, McCoy & Granger

[57] ABSTRACT

An ice cream dispenser having a container for receiving and containing ice cream is disclosed. The container has a piston therein which is mounted on a threaded rod to move the piston upwardly in the container through a shearing device. The ice cream is softened by the shearing device and is dispensed from a spout at the top of the container.

18 Claims, 2 Drawing Sheets

SOFT ICE CREAM DISPENSER

BACKGROUND OF THE INVENTION

This invention relates to ice cream dispensers and, more particularly, to hand-operated ice cream dispensers particularly adapted for home use.

During the manufacture of ice cream, the final step, after packaging, is a hardening step, which is accomplished by passing the packaged ice cream through freezing tunnels or refrigerated plate hardeners, or by placing it in low-temperature rooms where the temperature is maintained at about −30° C. and where the air is usually circulated to facilitate heat transfer. The degree to which the ice cream is frozen, the formulation of the ice cream, and/or the amount of air that is entrapped in the ice cream during processing contribute to the hardness of the ice cream when one attempts to scoop the ice cream from the container. Attempts to soften the ice cream by permitting the ice cream to stand at room temperature, or even placing the ice cream in a microwave oven, produce mixed, and sometimes unfortunate, results. Moreover, attempting to pack such hard ice cream in cones tends to break the cone material.

This invention provides a device for softening and dispensing ice cream which is adapted for home use and which may be stored in the freezer section of a refrigerator. The device is operated by a hand crank, and dispenses the ice cream in a softened condition, including those ice creams containing fruits and nuts without damaging those ingredients.

The invention includes a container for receiving ice cream which may be initially cut into chunks by a knife rather than scooped from the ice cream container. The dispenser container has side walls and a bottom wall, and is provided with a removable cover having a dispensing spout. A piston is provided in the container and is mounted on an axially extending, threaded rod in the container. The rod is mounted for rotational movement in the container, and has one end mounted in a thrust bearing in the bottom wall. The piston, upon rotation of the rod, is axially movable along a rectilinear path from a first position adjacent the bottom wall along the side wall, and toward a second position adjacent the upper end of the side wall. An interengaging mechanism is provided between the piston and the side wall to prevent rotational movement therebetween. As the ice cream is forced toward the upper end of the container, it engages a shearing device which comprises a cutter having a rim and a multiplicity of spokes having planar shearing edges which are substantially perpendicular to the piston. The shearing mechanism includes a hub having one face defining a first non-circular recess receiving a corresponding non-circular end portion of the threaded rod. The removable cover includes a first closure member having a closure wall defining a volute channel facing the shearing mechanism and closely spaced therefrom. The volute channel has a progressively increasing cross section measured in a circular direction, with its larger cross section terminating in a circular dispensing spout. The closure wall has a central aperture therethrough, and the hub of the shearing mechanism has an axially projecting portion extending into the central aperture. The axially projecting portion of the hub has another face defining a second non-circular aperture. The closure member also includes a rotatable cover having a crank arm positioned over and closing the container, and having a non-circular axial projection received by the second non-circular aperture in the hub. Therefore, upon rotation of the crank, the piston is moved upwardly to force the ice cream into contact with the shearing device. The sheared and softened ice cream then enters the volute channel and is forced from the circular dispensing spout.

The container may be affixed to a table or kitchen counter top by a suction device so that ice cream may be conveniently dispensed therefrom into bowls or cones. Desirably, the container is constructed from a suitable plastic which offers some degree of insulation from ambient temperatures. If portions of the contents of the container are unused, however, the entire container may be placed in the freezer section of the refrigerator.

DETAILED DESCRIPTION OF THE INVENTION

Figure 1:
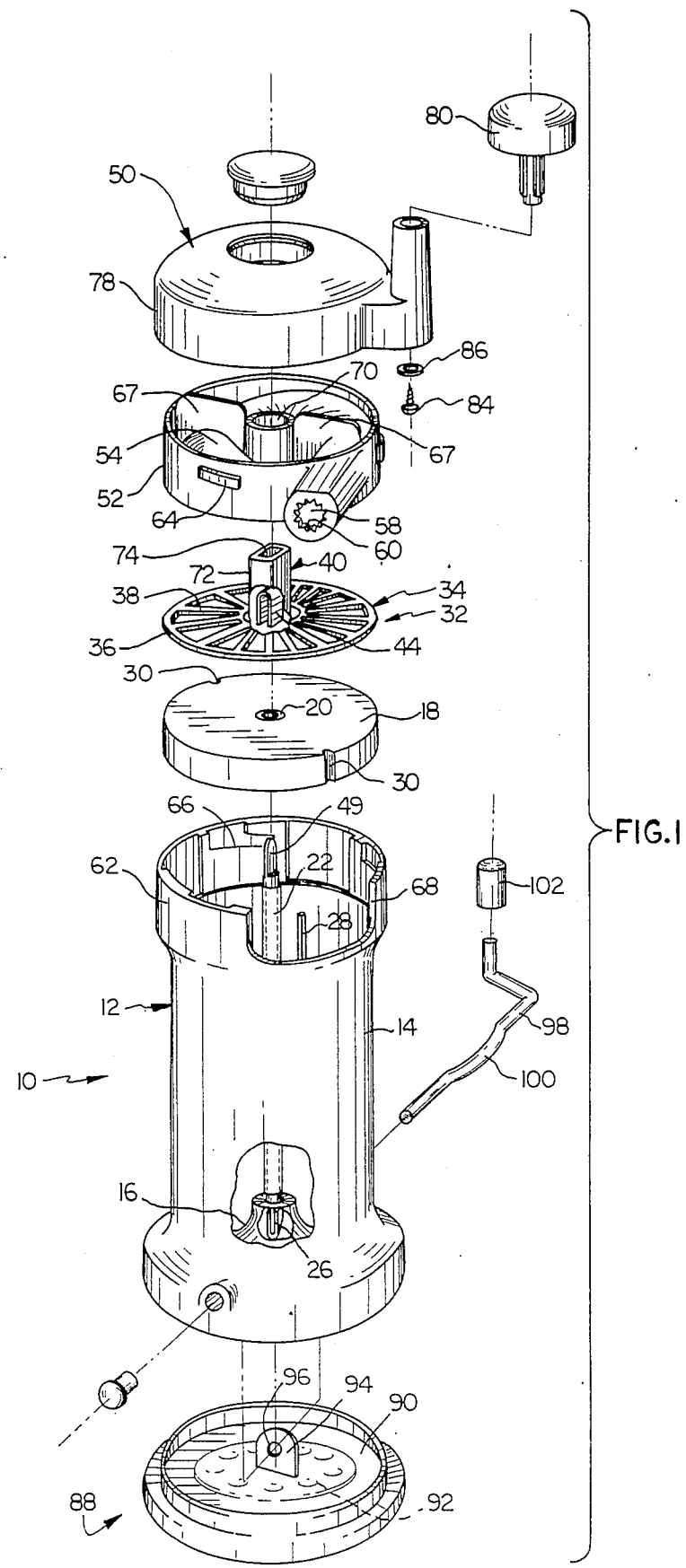
FIG. 1 is an exploded, perspective view of the ice cream dispenser according to this invention.

Referring now to the drawings, there is illustrated an ice cream dispenser 10. The dispenser 10 comprises a plastic container 12 having a cylindrical side wall 14 and a bottom wall 16. It may be noted that the bottom wall 16 is toroidal in shape for convenient cleaning.

A plastic piston 18 is provided in the container and has a threaded stainless steel insert 20 which is threadedly mounted on an axially extending threaded rod 22. The rod 22 is mounted for rotational movement in the container, and has one end 24 received in a cup-shaped thrust bearing 26, which is molded into the bottom wall 16 of the container. Rotation of the rod 22 in a clockwise direction as viewed from the top of the container causes the piston to move along a rectilinear path from a first position adjacent the bottom wall 16, along the side wall 14, and toward a second position adjacent the upper end of the side wall 14. Preferably, the threaded rod 22 is made from stainless steel, and has 32 threads per inch so that the upward progression of the piston 18 is gradual as the rod 22 is rotated. In order to prevent rotation of the piston 18 relative to the side wall 14, the side wall 14 is provided with diametrically opposed, inwardly projecting ribs 28 which cooperate with axial grooves 30 in the perimeter of the piston 18.

Figure 2:
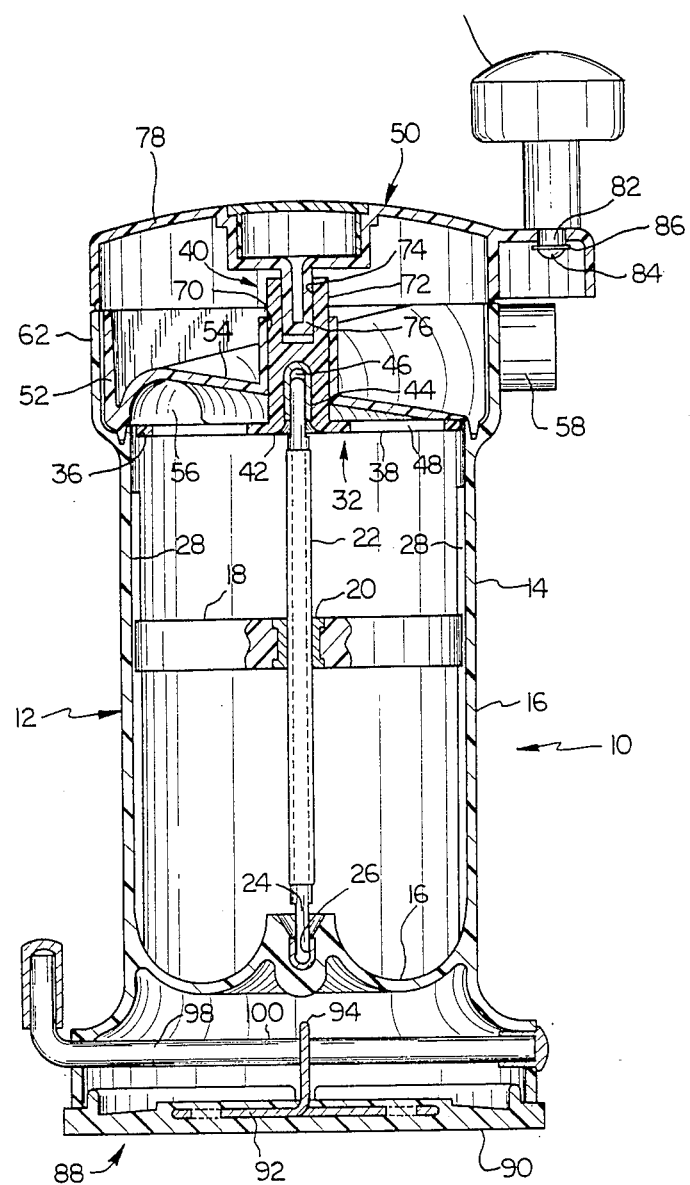
FIG. 2 is a cross-sectional view of the dispenser.

Rotation of the threaded rod 22 causes the piston 18, and therefore ice cream loaded in the container on the piston, to move upwardly toward the aforementioned second position of the piston and also causes rotation of a shearing device 32. As may be best seen in FIG. 2, the shearing device 32 comprises a wheel 34 having a rim 36 and a plurality of spokes 38 which radiate from a hub 40. The hub 40 has one face 42 which has a U-shaped insert 44 molded therein to define a non-circular recess 46. The non-circular recess 46 receives a flattened end portion 49 of the rod 22. As may be noted, the spokes 38 have shearing edges 48 which are planar and which are substantially perpendicular to the piston. Desirably, the thickness of the shearing edges 48 is 0.10 inch, so that as the ice cream is forced toward the openings between the spokes 38, the edges 48 tend to peel the solid ice cream rather than slice the ice cream, and the relatively blunt edge of the spoke does not tend to cut or otherwise damage any fruits or nuts in the ice cream. All portions of the ice cream are peeled in this manner in a gradual fashion, since each individual spoke rotates relative to the ice cream 32 times per inch of upward travel of the ice cream.

A removable cover assembly 50 closes the container 12 and includes a first closure member 52 having a closure wall 54 defining a volute channel 56 facing the shearing mechanism 32 and being closely spaced therefrom. The volute channel 56 has a progressively increasing cross section measured in a circular direction with its larger cross section terminating in a circular dispensing spout 58. The perimeter of the dispensing spout 58 may be provided with notches 60 to provide a decorative effect to the dispensed product. The first closure member 52 is received in an enlarged upper end portion 62 of the container 14 and is removably held therein by a bayonet-type connection which includes projections 64 on the closure member 52 which cooperate with slots 66 in the enlarged portion 62. The connection is made by grasping ears 67 and exerting a twisting motion. A portion of the enlarged portion 62 is removed to provide an arcuate aperture 68 to accommodate the spout 58. The closure wall 54 further defines a central aperture 70 therethrough which receives an axially projecting portion 72 of the hub 40. The portion 72 is provided with a non-circular recess 74 which receives a non-circular projecting portion 76 of a second closure member 78. The second closure 78 serves as a driving device for the shearing device 32, and therefore as a drive for the threaded rod 20, and is provided with a turning knob 80 which is rotatably mounted on the member 78 by a projecting bearing end portion 82 and retained thereon by a screw 84 and a washer 86.

The dispenser 10 may be detachably mounted on a counter top or table by a suction device 88 which includes a flexible rubber foot 90 having a metal plate 92 molded therein. The plate 92 has a projecting portion 94 which is provided with an aperture 96. A locking rod 98 having an axially offset central portion 100 extends through the aperture 96 so that axial rotation of the rod 98 by a projecting handle 102 causes the portion 94 to move upwardly and create a vacuum between the foot 90 and its mounting surface.

Although the preferred embodiment of this invention has been shown and described, it should be understood that various modifications and rearrangements of the parts may be resorted to without departing from the scope of the invention as disclosed and claimed herein.

What is claimed is:

1. An ice cream dispenser comprising a container for receiving ice cream, said container having side wall means, bottom wall means, and removable cover means defining a dispensing spout, said removable cover means including a first closure member having a closure wall defining a volute channel facing said shearing means and being closely spaced therefrom, said volute channel having a progressively increasing cross section measured in a circular direction, with its larger cross section terminating at said dispensing spout, piston means movable along a rectilinear path from a first position adjacent said bottom wall means, along said side wall means, and toward a second position adjacent said cover means, shearing means between said second position and said cover mounted for movement in a plane substantially normal to said path, means to drive said piston means along said rectilinear path, said drive means being operatively connected to said shearing means to move said shearing means in said plane as said piston approaches said second position, whereby ice cream placed in said container may be moved through said shearing means and extruded from said dispensing spout by said piston means upon actuation of said drive means to shear and thereby soften said ice cream.

2. An ice cream dispenser according to claim 1, wherein said dispensing spout is cylindrical and has a multiplicity of V-shaped notches at its end.

3. An ice cream dispenser according to claim 1, wherein a vacuum cup is provided on the container so that the container may be securely mounted on a work surface.

4. An ice cream dispenser according to claim 1, wherein said drive means comprises a threaded rod threadedly engaged with threads in said piston and fixed to said shearing means.

5. An ice cream dispenser according to claim 4, wherein said shearing means comprises a cutter having a rim and a multiplicity of spokes radially extending from a hub to said rim and wherein said hub is fixed to said threaded rod.

6. An ice cream dispenser according to claim 1, wherein said side wall means and said piston are cylindrical and interengaging means are provided between said piston and said side wall means to prevent rotational movement therebetween.

7. An ice cream dispenser according to claim 6, wherein said interengaging means comprises at least one longitudinal rib along said side wall means cooperating with at least one longitudinal groove in said piston means.

8. An ice cream dispenser according to claim 1, wherein said shearing means comprises a cutter having a rim and a multiplicity of radially extending spokes and wherein said piston forces said ice cream through spaces between said spokes to be sheared by said spokes.

9. An ice cream dispenser according to claim 8, wherein said spokes have shearing edges which are planar and which are substantially perpendicular to said planes.

10. An ice cream dispenser according to claim 1, wherein said first closure member has a cylindrical wall extending upwardly from said closure wall and having locking means engaging a portion of said side wall means.

11. An ice cream dispenser according to claim 10, wherein said locking means is a bayonet connector.

12. An ice cream dispenser according to claim 10, wherein radially extending tabs extend from said closure wall to permit the first closure member to be grasped and turned for locking and unlocking.

13. An ice cream dispenser comprising a cylindrical cup-shaped container defined by a cylindrical side wall and a bottom wall, a piston threadedly mounted on an axially extending threaded rod in said container, said rod being mounted for rotational movement in said container and having one end mounted in a thrust bearing in said bottom wall, said piston, upon rotation of said rod, being axially movable along a rectilinear path from a first position adjacent said bottom wall, along said side wall, and toward a second position adjacent the upper end of said side wall, interengaging means between said piston and said side wall to prevent rotational movement therebetween, shearing means spaced above said second position, said shearing means comprising a cutter having a rim and a multiplicity of spokes having shearing edges which are planar and which are substantially perpendicular to said piston, said shearing means further comprising a hub having one face defining a first non-circular recess receiving a corresponding non-circular end portion of said threaded rod, a removable cover including a first closure member having a closure wall defining a volute channel facing said shearing means and being closely spaced therefrom, said volute channel having a progressively increasing cross section measured in a circular direction, with its larger cross section terminating in a circular dispensing spout, said closure wall having means defining a central aperture therethrough, said hub having an axially projecting portion extending into said central aperture, said axially projecting portion of said hub having another face defining a second non-circular aperture, a rotational cover having a crank arm positioned over and enclosing said container and having a non-circular axial projection received by said second non-circular aperture, whereby manual rotation of said rotatable cover by operation of said crank arm rotates said shearing means and said threaded rod to cause said piston to progress from said first position toward said shearing means.

14. An ice cream dispenser according to claim 13, wherein said interengaging means comprises at least one longitudinal rib along said side wall cooperating with at least one longitudinal groove in said piston means.

15. An ice cream dispenser according to claim 13, wherein said dispensing spout has a multiplicity of V-shaped notches at its end.

16. An ice cream dispenser according to claim 13, wherein said first closure member has a cylindrical wall extending upwardly from said closure wall and having locking means engaging a portion of said side wall.

17. An ice cream dispenser according to claim 16, wherein said locking means is a bayonet connector.

18. An ice cream dispenser comprising a container for receiving ice cream, said container having side wall means, bottom wall means, and removable cover means defining a dispensing spout, piston means movable along a rectilinear path from a first position adjacent said bottom wall means, along said side wall means, and toward a second position adjacent said cover means, shearing means between said second position and said cover mounted for movement in a plane substantially normal to said path, means to drive said piston means along said rectilinear path, said drive means comprising a threaded rod threadedly engaged with threads in said piston and being fixed to said shearing means to move said shearing means in said plane as said piston approaches said second position, said shearing means comprising a cutter having a rim and a multiplicity of spokes radially extending from a hub to said rim, said hub being fixed to said threaded rod, said removable cover means including a second closure member having a crank arm associated therewith, one face of said hub defining a first non-circular recess receiving a corresponding non-circular end portion of said threaded rod, another face of said hub defining a second non-circular recess, said second closure member having an axially projecting non-circular portion received in said second non-circular recess.

* * * * *